United States Patent [19]

Cohen et al.

[11] 4,270,185

[45] May 26, 1981

[54] MEMORY CONTROL CIRCUITRY FOR A SUPERVISORY CONTROL SYSTEM

[75] Inventors: Yitzhak Cohen, Yahud; Yigal Brandman, Ramat Hasharon, both of Israel; Zvi Eckstien, Highland Park, Ill.

[73] Assignee: Motorola Israel Limited, Tel-Aviv, Israel

[21] Appl. No.: 966,286

[22] Filed: Dec. 4, 1978

Related U.S. Application Data

[62] Division of Ser. No. 807,850, Jun. 20, 1977, Pat. No. 4,161,718.

[51] Int. Cl.³ .............................................. G11C 7/00
[52] U.S. Cl. ................................ 364/900; 235/92 DP
[58] Field of Search ... 364/900 MS File, 200 MS File; 235/92 DP, 92 PE, 92 T

[56] References Cited

U.S. PATENT DOCUMENTS

| 3,644,895 | 2/1972 | Hemdal et al. | 364/900 |
| 3,688,275 | 8/1972 | Fredrickson et al. | 364/900 |
| 3,896,417 | 7/1975 | Beecham | 364/900 |
| 4,096,565 | 6/1978 | Ruckdeschel | 364/200 |

Primary Examiner—Joseph M. Thesz
Attorney, Agent, or Firm—Rolland R. Hackbart; James W. Gillman

[57] ABSTRACT

An automatic supervisory control system is arranged to provide monitoring and supervisory functions in a noisy electrical environment over communication channels which are also noisy and generally highly congested. The system includes a central control station linked to a plurality of status stations by a single dedicated or shared radio channel, a plurality of telephone wire lines, or a combination of both. A coded signal is used to communicate status signals and command signals between the central control station and the status stations. The central control station includes the status display elements, the memory elements, an audible alarm indicator, printed status and command reports, a keyboard for data entry and a computer for controlling system operation.

10 Claims, 13 Drawing Figures

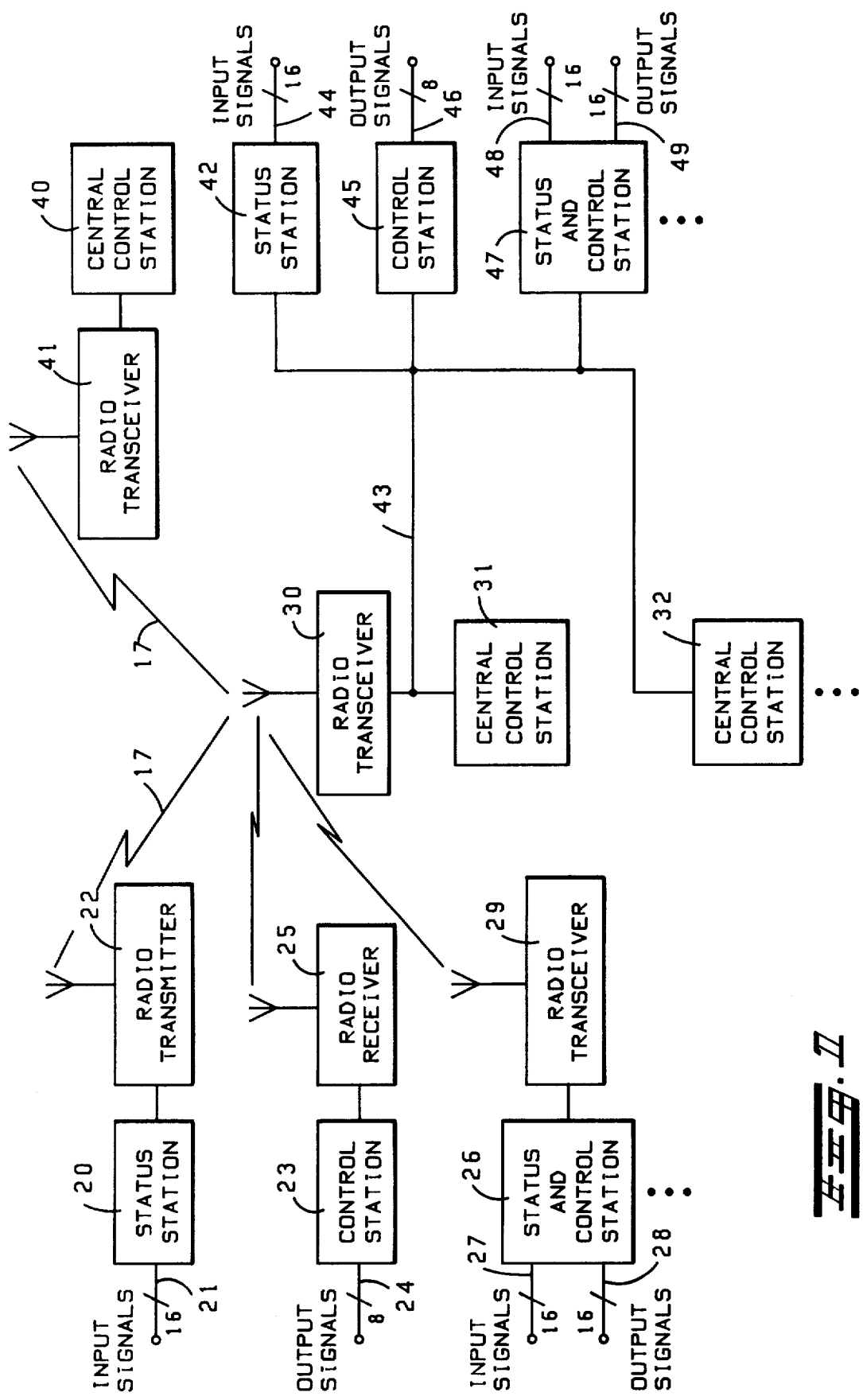

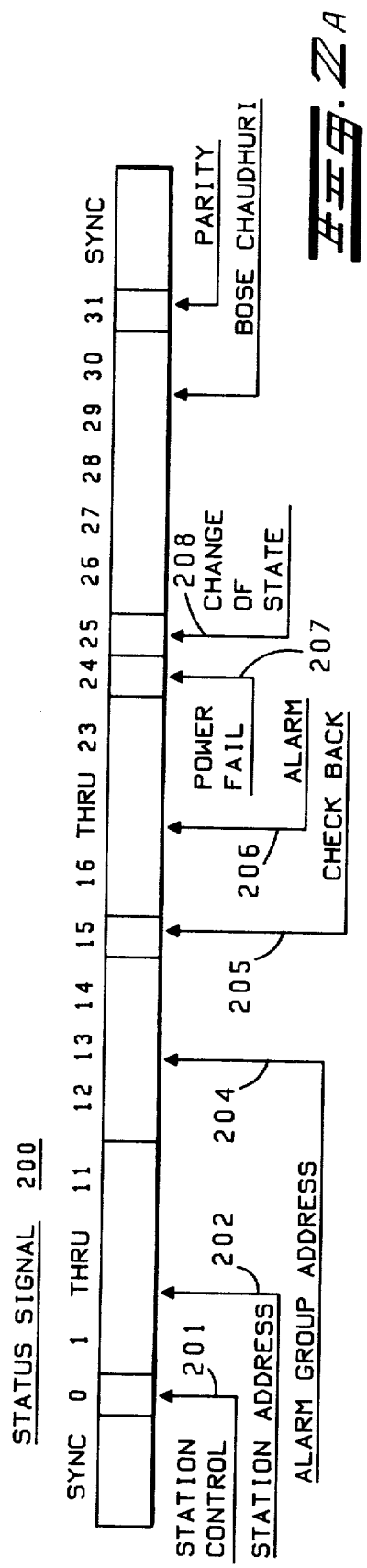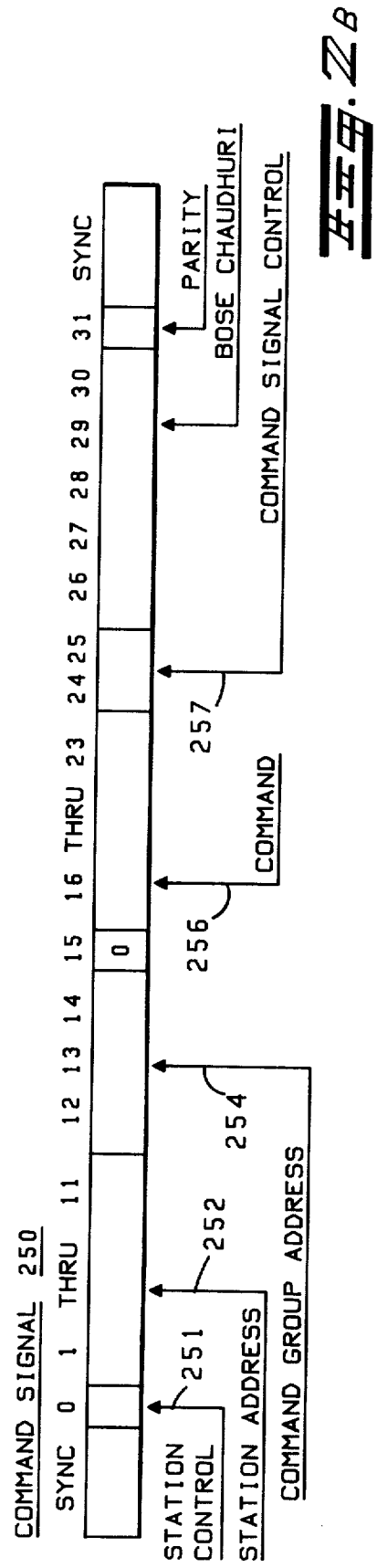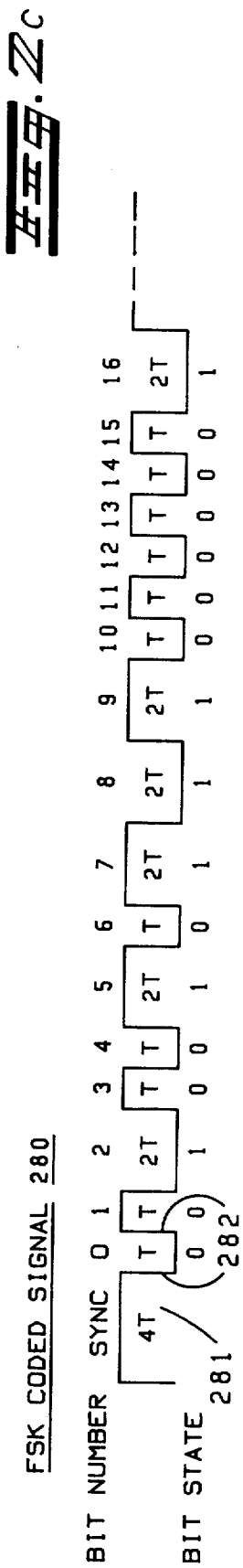

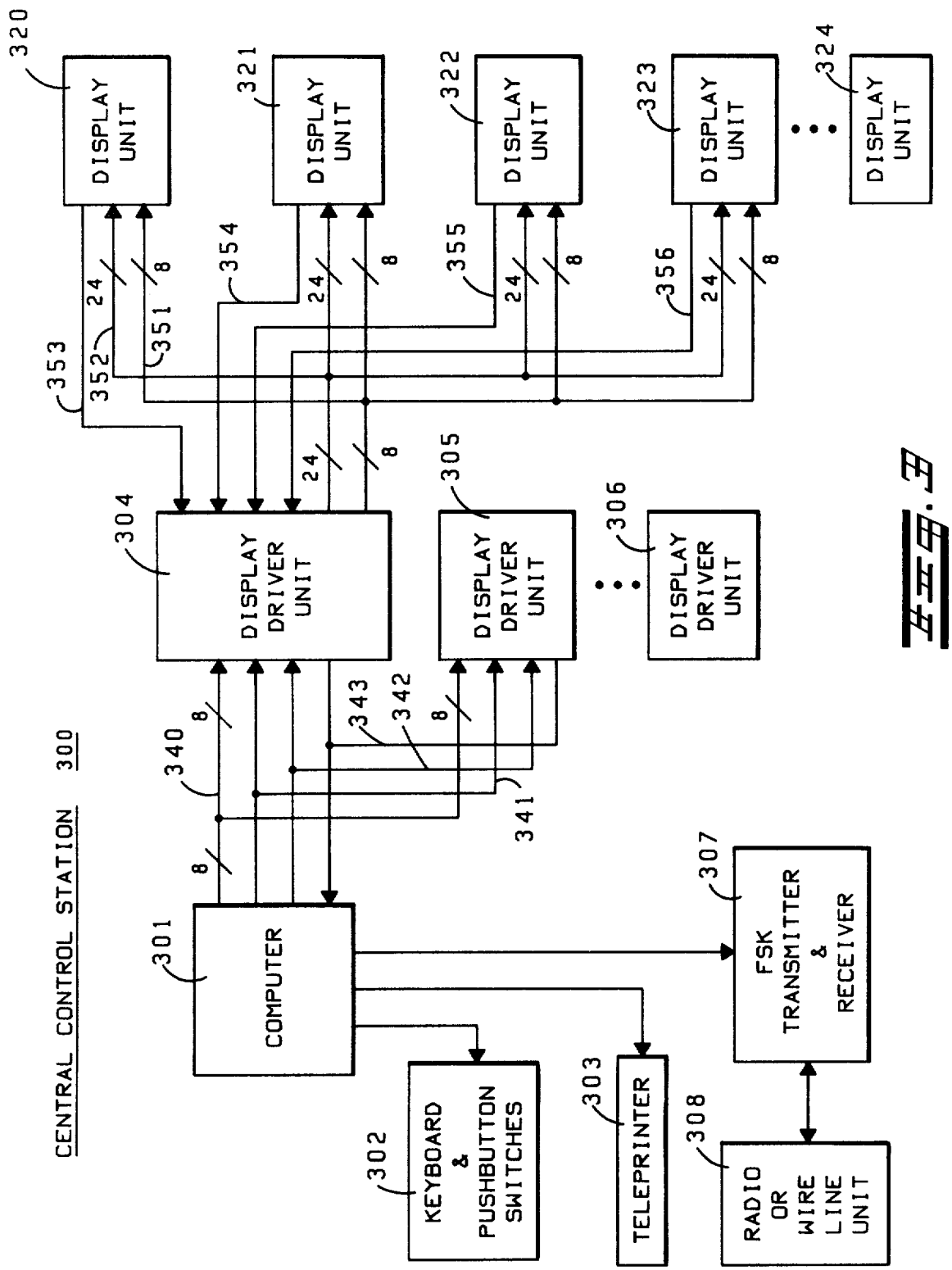

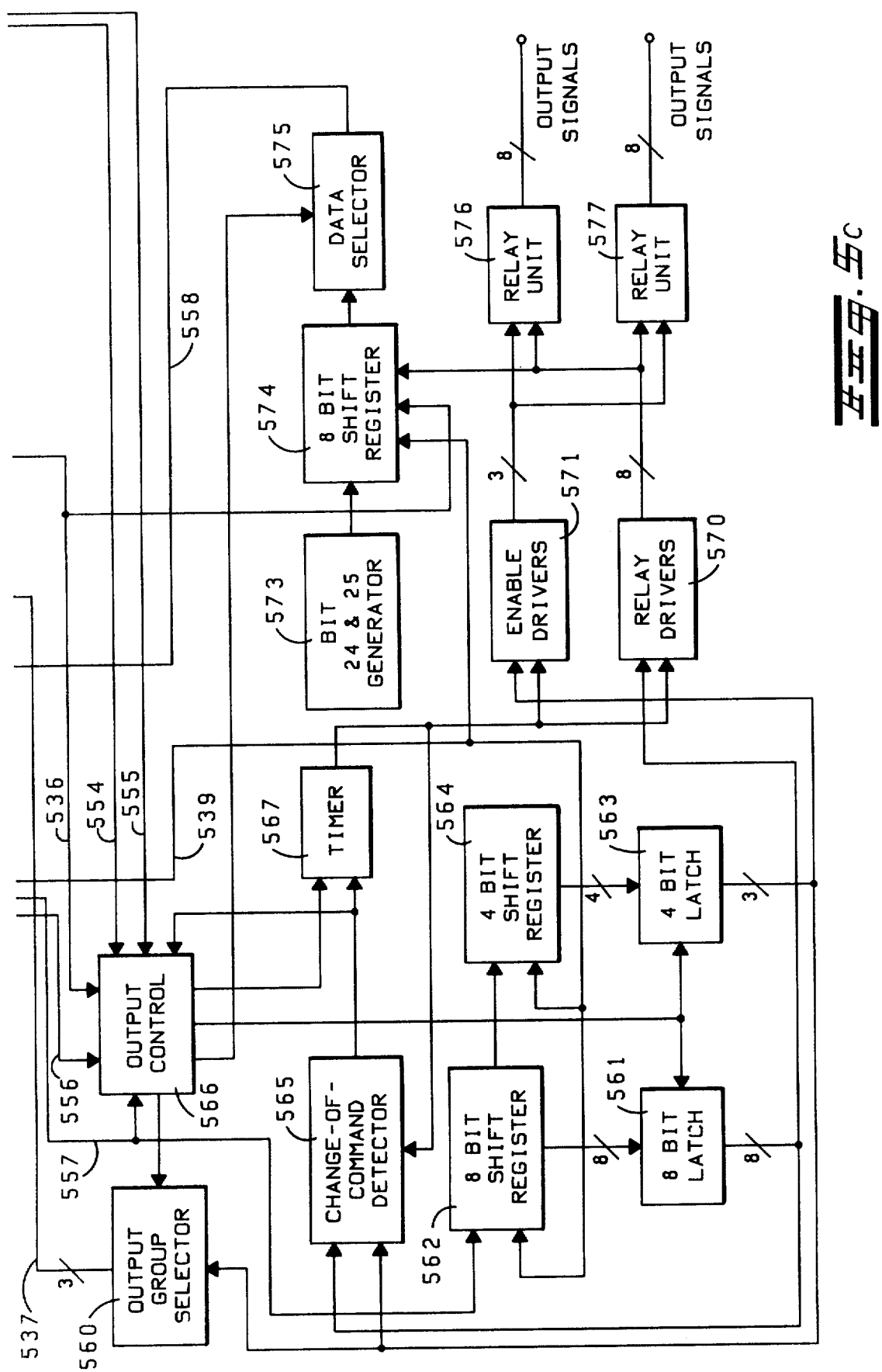

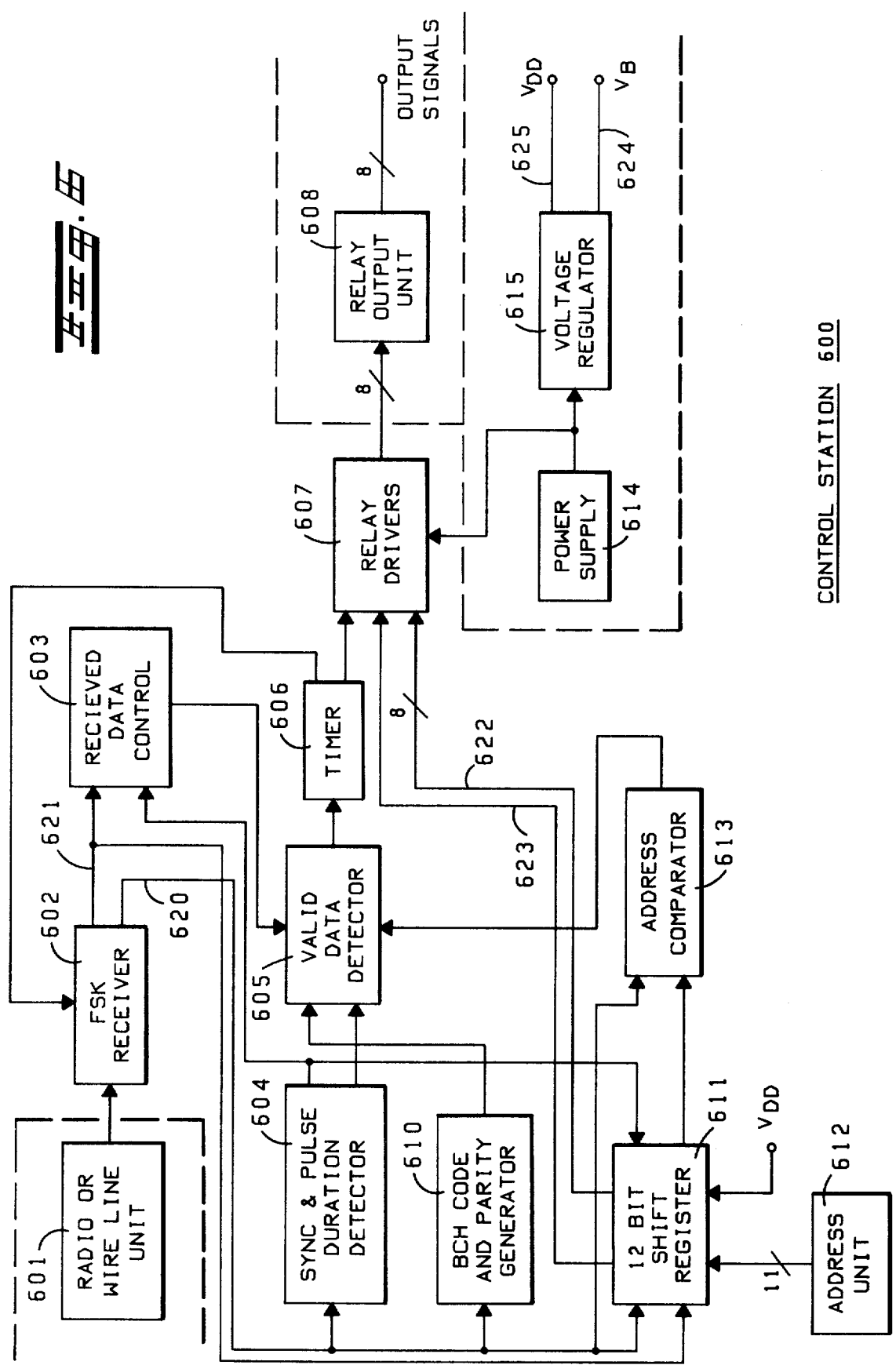

MEMORY CONTROL CIRCUITRY FOR A SUPERVISORY CONTROL SYSTEM

This is a divisional of application Ser. No. 807,850, filed June 20, 1977, which has matured into U.S. Pat. No. 4,161,718.

BACKGROUND OF THE INVENTION

1. Field of the Invention

This invention relates to a supervisory control system, and more particularly, to a method and apparatus for an improved supervisory control system.

2. Description of the Prior Art

Supervisory control systems often must operate in an extremely noisy electrical environment. For example, such a system used to monitor and control status monitoring stations for a network of substations and transformers connected to a power plant of a power utility is highly susceptible to the high voltage and electrical noise environment. To cope with such an environment, typically prior art systems have been arranged to repetitively send a signal and detect and compare the repetitively sent signals and send a return signal when the comparison indicates reliable reception. But such a system is not found very reliable when a high level of noise is injected into the system from the power plant substations or transformer or other external sources. Generally the prior art systems are found incapable of providing reliable monitoring and supervisory functions in a noisy environment.

Also it is found that as the number of the monitoring stations increases and as channels allocated for transmission of monitoring, status, supervisory, and similar signals get crowded, the prior art supervisory systems are found incapable of expanding their capacity. To increase capacity, the systems require additional communication channels. They are not capable of sharing existing radio channel or using existing voice communication channels. They do not allow easy and inexpensive expansion for additional stations that grow upwards to thousands of stations. Confronted with this situation, some prior art systems resort to manual operation where interrogation of the stations is more generally accomplished by operator assisted manual methods.

In short, none of the prior art systems provides a satisfactory automated supervisory control system that is highly reliable and that can operate in a noisy environment and that can handle large numbers of monitoring stations. For the foregoing and other shortcomings and problems, there has been a long felt need for an improved supervisory control system.

OBJECTS OF THE INVENTION

It is an object of the invention to provide an improved supervisory control system.

It is a further object of the invention to provide an improved supervisory control system that is highly reliable in the transmission and reception of status and command signals.

It is a still further object of the invention to provide an improved supervisory control system that includes a large number of stations and that can be easily expanded to accommodate additional stations.

It is a still further object of the invention to provide an improved supervisory control system that can operate reliably in noisy and hostile environments.

SUMMARY OF THE INVENTION

In accordance with the present invention, the aforementioned problems and shortcomings of the prior art are overcome and the aforementioned and other objects are attained by an inventive method and an inventive system.

According to an important feature of the invention, a control circuitry for inputing data into a memory includes means for providing a train of clock pulses, counting means, an enable signal source for providing an enable signal, second counting means, and a memory. The first counting means is enabled by the enable signal to count a predetermined number of clock pulses in successive frames and provide a first output pulse for each of the frames. The second counting means is enabled by the enable signal to count a predetermined number of first output pulses and provide a second output pulse thereafter. The memory is responsive to the second output pulse for storing data.

Additional features, objects, and advantages of the supervisory control system in accordance with the present invention will be more clearly apprehended from the following detailed description together with the accompanying drawings.

BRIEF DESCRIPTION OF THE DRAWINGS

FIG. 1 illustrates a supervisory control system of the present invention.

FIG. 2, including FIGS. 2A, 2B and 2C, illustrate the format of the coded signals which are utilized by the supervisory control system FIG. 2A shows in detail the organization of the status signal transmitted by the respective stations to central control station. FIG. 2B shows in detail the organization of the command signal transmitted by the central station to the stations. FIG. 2C shows the detailed timing for a frequency shift keying modulated coded signal with a randomly selected sequence of bit states.

FIG. 3 shows a general block diagram of the central control station.

FIG. 5, including FIGS. 5A, 5B and 5C shows a block diagram of the status and control station.

FIG. 6 shows a block diagram of the control station.

I. GENERAL DESCRIPTION

A. System

Figure 4:
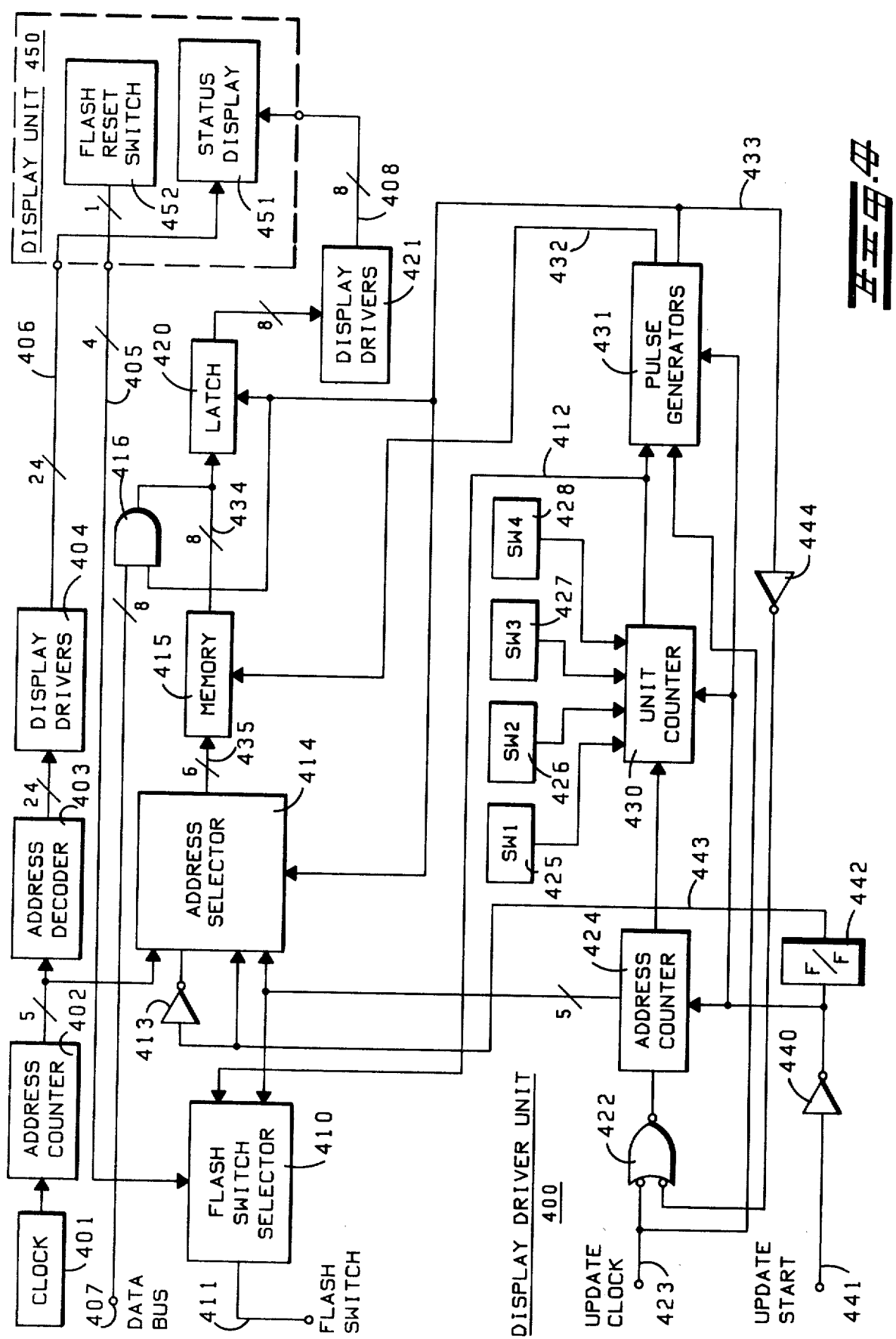
FIG. 4 shows a detailed block diagram of the display driver unit and the display unit which are sub-units of the central control station.

Referring now to FIG. 1 of the drawings, it is intended that the stations of the supervisory control system can be located physically adjacent to one another or can be remotely located from one another and interconnected by a communication means. It is further intended that many more of each type of station can be added to the configuration of the system shown in FIG. 1. The communication links shown in FIG. 1 can be either radio communication links or telephone wire line communication links. Many other means for providing communication links and system configurations can be devised by those skilled in the art.

Central control station 31 is connected by telephone wire lines to radio transceiver 30, status station 42, control station 45, status and control station 47, and central control station 32. Radio transceiver 30 communicates by way of a single duplex radio channel 17 to radio transceiver 41, radio transmitter 22, radio receiver 25, and radio transceiver 29. The central control station 40 is connected to radio transceiver 41. The status station 20 is connected to radio transmitter 22. The control station 23 is connected to radio receiver 25. The status and control station 26 is connected to radio transceiver 29. The status stations 20 and 42 monitor up to 16 input signals 21 and 44 respectively. Control stations 23 and 45 can send out up to 8 output signals 24 and 46 respectively. Status and control stations 26 and 47 can each monitor 16 input signals 27 and 48 respectively and can control up to 16 output signals 28 and 49 respectively.

The supervisory control system of the preferred embodiment has the capacity for 2,048 stations. However, systems can be devised with many more or even less stations. Each of the 2,048 individual stations can have up to 16 output signals and 16 input signals. Each of the central control stations 31, 32, 40 can interact with 512 stations. Thus, four central control stations are required for a supervisory control system with 2,048 stations. For the purpose of increasing reliability, two redundant central control stations could be co-located and configured to control the same 512 stations.

In the supervisory system shown in FIG. 1, messages are communicated over a transmission channel, a radio channel or a plurality of wire lines, between the central control stations and the plurality of status, control, and status and control stations. Command signals are sent from the central control stations to control stations or status and control stations to enable particular stations to send selected output signals. Status signals, reflecting the change of state of input signals, are transmitted from status stations or status and control stations to the central control stations where the changed status signals are displayed as alarm conditions. The operator manning the central control station then acts on the alarm conditions as called for by the changed status signals.

B. Signalling Format and Scheme

The signalling scheme used in the present invention is essentially digital in nature. The status or command signals are rendered in digital word form. Each digital work includes, for convenience, a given number of digital bits, for example, 32 bits. The signals in the digital work forms are encoded into the well known frequency shift keying (FSK) format for transmission purposes. To assure transmission and reception in noisy environment, the signals are sent repetitively. For example, a command or a status signal, in the form of 32 digital bits, is sent in successive frames. Each frame may have a given number, for example, 20 digital words transmitted in series, thereby providing message redundancy. The number of frames repeated for transmission is selected to assure correct transmission and reception. In the present system the frames are repeated up to 8 times. Preferably the number of frames of the digital word signals repeated is selected to assure time diversity, that is, given a particular interval of any noisy transmission that may have taken three frame intervals, by repeating 8 times, the receiver is enabled to disregard the noisy frames essentially, and receive the remaining frames properly in receiving the transmitted signal.

FIGS. 2A and 2B show detailed illustrations of the digital bit organization of the 32 bit digital word for the status and command signal, respectively.

Referring to FIG. 2A, the status signal 200 in the form of a 32 bit digital word is composed of 26 information bits (bit 0 through bit 25) and 6 security bits (bit 26 through bit 21). The information bits are made up of station control (bit 0), station address (bit 1 through 11), alarm group address (bit 12 through 14), check-back bit (bit 15), alarm bits (bit 16 through 20), primary power fail bit (bit 24) and a change-of-state bit (bit 25). The station control bit 201 (bit 0) is always coded as a logic 1. The station address 202 (bits 1 through 11) is a binary address which identifies each individual station. Bits 10 and 11 identify one of four central control stations. The alarm group address 204 (bits 12 through 14) is used to select up to 8 alarm groups of which only two are presently used in the preferred embodiment. The check-back bit 205 (bit 15) is used for system control, as will be explained shortly. Each of the alarm bits 206 (bits 16 through 23) is associated with one of eight binary status signals. The primary power fail 207 is indicated by bit 24. The change-of-state (COS) mode 208 is indicated by bit 25.

The security signal includes bits 26 through 31 and is composed of a 5 bit Bose Chaudhuri (BCH) cyclic code and a parity bit for detecting errors in the status signal 200.

The status signal 200 in the form of 32 bit digital word is transmitted from the status stations 20 and the status and control stations 26 to the central control stations 31 to report the status of the monitored input signals 21 and 27 respectively (see FIG. 1).

Referring to FIG. 2B, the command signal 250 is likewise composed of 26 information bits and 6 security bits. The information bits are made up of the station control bit (bit 0), the station address (bits 1-12), the command group address (bits 12-14), an unused bit (bit 15), the command bits (bits 16-23) and the command signal control bits (bits 24 and 25). The station control bit 251 (bit 0), if encoded as a logic 1, directs the command signal to a particular station, and, if encoded as a logic 0, directs the command signal 250 to a group of stations. The station address 252 (bits 1 through 11) can select any one station or a group of stations in response to the station control bit 251. The command group address 254 (bits 12 through 14) can select any one of 8 command groups, although only 2 command groups are used in the preferred embodiment. The unused bit 15 is a logic 0, and is presently not allocated to a particular function in the preferred embodiment. Each of the command bits 256 (bits 16 through 23) encodes a binary command for each one of the 8 command signals. The command signal control work 257 (bits 24 and 25) selects one of 4 operational modes in the stations. The station operational modes are the execute mode, interrogate mode, select mode and acknowledge mode, as will be explained later.

The status signals and command signals are encoded according to frequency-shift keying (FSK) modulation, which shifts between 900 hertz and 1500 hertz tone signals for each bit of the coded signal and codes logic 1 bits with a pulse width twice as long as logic 0 bits. FIG. 2C shows a 16 bit segment of the 32 bit digital word in the form of a frequency-shift keying (FSK) modulated signal 280. The FSK modulated signal includes a synchronization signal and a digital word as illustrated. The synchronization signal 281 is coded with a pulse width four times as long as that of a logic 0, the logic 0 pulse width being represented by a time period "T". The digital word is made up of transitions between 900 and 1500 hertz in T or 2T time intervals as illustrated. The transitions 282 between tones, 900 hertz and 1500 hertz, are illustrated by the changes in state of the waveform. The FSK modulated signals can be transmitted over a radio channel or over a telephone wire line that has sufficient bandwidth to pass the 900 hertz and 1500 hertz tones.

The transmission of the coded signals between the stations utilizes both the message redundancy and the time diversity principle to insure that the coded signals are received in the noisy environment. To obtain message redundancy, each coded signal is transmitted up to 20 times in a two second interval or can optionally be transmitted eight times in a one-half second interval. The message redundancy increases the probability of reception under conditions of severe noise. The reception of just one of the coded signals is sufficient to get the message through.

Time diversity is achieved by repeating the two second messages (or one-half second messages) up to eight times at intervals of approximately one minute. If the first transmission of messages is lost due to radio frequency interferance or noise interferance on a telephone line, then subsequent messages have a high probability of being received. The number of repetitions of the bursts of messages can be adjusted to suit the particular system. In addition, a channel monitor can be used to ascertain if there is any activity on the radio channel or on the telephone wire line before transmitting a particular burst of messages. The channel monitor would insure that two stations are not attempting to transmit messages at the same time.

A received coded signal is subjected to a number of tests to determine that the coded signal is valid. The FSK modulated coded signal is checked for proper bit width of the binary signals and the synchronization signal. The coded signal is checked to insure that a synchronization signal precedes and follows the coded signal and also that the coded signal is composed of exactly 32 bits. The security portion of the coded signal includes checking the Bose Chaudhuri (BCH) cyclic code and the parity code. Together, the Bose Chaudhuri and parity checks reject all one bit errors, all two bit errors, all three bit errors, approximately 96% of all four bit errors, all odd numbered errors and all bursts of errors up to 31 bits in length. The level of security provided insures very reliable system operation under high noise conditions.

The reliability of the signalling scheme is further enhanced by use of a check-forward or check-back mode of operation or both, where necessary. Briefly stated, according to the check-forward mode of operation, a command signal received at the remote stations are compared to an applied command signal, which is the stored command signal that is momentarily applied to the output means, and if the received command signal is identical to the applied command signal, the output means is permanently enabled. By way of the check-forward method, the circuitry at the remote station is checked at the output means, not just at the receiving means.

According to the check-back mode of operation, a received command signal is transmitted from a remote station back to central control station where the central control station verifies that the command signal is identical to the signal it had originally sent. Then, the central control station transmits the command signal again for subsequent execution. The remote station receives the second transmission of the command signal and enables the output means accordingly. The signalling scheme further provides that the remote station can perform a check-forward operation on the first and second transmissions of a check-back command signal. The check-back mode of operation which requires three transmissions, two from the central control station and one from the remote station, provides additional reliabilitly at the cost of creating congestion on the communication channel.

II. DETAILED DESCRIPTION

A. Central Control Station

A central control station is used to provide all necessary control functions for the system. The central control station includes a computer, a plurality of peripheral equipments such as keyboard for operator-machine interface, teleprinter, FSK transceiver facility, and the like. The station also includes a plurality of display units, and display drivers for driving the display unit under the command of the computer.

The present illustrative central control station is designed to handle up to 512 stations. The central control station computer has a stored program for providing system flexibility to accommodate a wide variety of requirements and options. The stored program of the central control station has an executive program and a plurality of subprograms for providing the features and operational capabilities described hereinafter. The various programs can be written by one skilled in the art based on the following description of the central control station features and operation. The central control station man-machine interface allows an operator to interact with the stations in the system for various diverse functions as will be explained in detail hereinafter.

Referring to further details, as illustrated in FIG. 3, the central control station 300 includes a computer 301, keyboard and pushbutton switches 302, a teleprinter 303, an FSK transmitter and receiver 307, a radio or wire line unit 308, display driver units 304 to 306 and display units 320 to 324. The computer 301 can be any of a number of commercially available minicomputers or microcomputers, such as the Motorola M6800 system. The computer 301 samples the status of the keyboard and pushbutton switches 302. The keyboard can be of any suitable type. For example, it can be of the type that has a 3×5 array of pushbuttons including the digits 0 through 9 and alphabetical characters A and B. The keyboard is similar to a telephone keyset. The pushbutton switches include an entry clear key, message send key, printer control keys, time set key, operation mode select keys, an audio alarm reset key, and display control keys. The functioning of the keyboard and pushbutton switches will be discussed shortly.

The computer 301 is of the type that can be operated to provide an output to an 80 column serial ASC II external printer 303. The teleprinter 303 is driven by the computer 301 and automatically prints out all status signals received from the stations, an indication of the status signals which have changed, all operator initiated command signals to the stations, summaries of the status of the stations at predetermined time intervals and any other types of information. Received status signals, which indicate a change-of-state (COS) of one or more of the status signals, are referred to as alarm messages and cause an audible alarm to be activated. The audible alarm is turned off by depressing the audio reset pushbutton.

By operator entered directives, the stored program of the central control station can provide the following printouts:

status summary of all stations or a set of stations; status of a selected station; and COS status for all stations or a set of stations. The printer control keys, print disable, alarm print, and summary print, together with the keyboard are used by the operator to select the foregoing printouts.

The computer 301 transmits command signals and receives status signals through the FSK transmitter and receiver 307. The FSK transmitter and receiver 307 performs the FSK conversion for transmitted and received signals and is connected to a radio or wire line unit 308 which provides a transmission channel to the stations in the supervisory control system. The stored program in the computer 301 performs all the validity checks on the received status signals and generates the pulse duration timing and security codes for the transmitted command signals.

The computer 301 communicates display data to and receives display unit status from the display driver units 304, 305 and 306. The computer 301 communicates to the display driver units 304 to 306 by means of an eight bit data bus 340, and update clock signal 341, an update start signal 342 and a flash switch signal 343. The display driver unit 304 communicates with the display units 320 to 323 by means of 24 display driver signals 352, 8 display driver signals 351, and flash reset switches 353 to 356. The display driver unit 304 stores the data received from the computer 301 to enable the light emitting diodes (LED) displays in the display units 320 to 323. The display units 320 to 323 each contain up to 48 LED display indicators. Each of the display units can provide a visual indication of the status of any of the stations in the system. In the preferred embodiment, the computer 301 can communicate with up to 16 display driver units each controlling 4 display units, for a total of 64 display units. Three of the display units are combined to provide a control display, which includes a 6 digit 7 segment display for display of the time, keyboard entries and program control modes; command indicators; a time set indicator; a set indicator; a printer indicator; a set call indicator; an audio disable indicator; and a display overflow indicator.

The central control station incorporates a shared display concept which provides fewer display units than there are stations in the supervisory control system. A portion of the display units is organized together as a rolling display. The display units in the rolling display physically are located side by side to facilitate observation by an attendant. Alarm messages are entered into the leftmost display unit of the rolling display and the changed status signals are flashed in the display. The flashing of the received alarm message can be reset by depressing the reset pushbutton for that display unit. If an alarm message is received from a station and the rolling display is completely filled, the status signal for that station is stored in the overflow memory in the computer for subsequent display, and the display overflow indicator is flashed.

By depressing the roll key, the status signal in the leftmost display unit is deleted, the status signals in the display units to the right of the vacated display unit will each be shifted to the left, and the highest priority message in the overflow memory will be displayed on the rightmost display unit in the rolling display. Flashing status signals that have been rolled out of the rolling display are stored back into the overflow memory. The overflow memory can store all of the alarm messages which exist in the system. A specific station can be rolled off the rolling display by entering the octal coded station address from the keyboard before depressing the roll key. By repeatedly depressing the roll key, all of the alarm messages with a flashing indication in the overflow memory can be reviewed in the rolling display.

To fix a display unit in the rolling display to a particular station, a station address is entered from the keyboard and the call fixed key is depressed. The status signals for the specified station will be displayed in the leftmost display unit. If there are one or more previously allocated fixed display units, the newly entered fixed display unit will be the display unit immediately to their right. Any number of display units can be fixed, providing that at least one display unit remains available for alarm messages. A fixed display unit is indicated by illumination of the decimal point in the rightmost digit of the station number display.

The stored status signals of any station can be entered into an available display unit by entering the station address from the keyboard and depressing the recall key.

Several different operation modes of the central control station can be entered by using the operation mode select keys and the keyboard. A parameter mode of operation is used to select the frequency of automatic interrogations of stations and to enter the stations which will be automatically interrogated. The parameter mode is entered into and exited from by consecutively depressing five numerical keys and a sixth key for the particular operation desired. The sequence of numerical keys entered is displayed in the control display.

An interrogate mode provides for manual interrogation of a selected station or group of stations. To interrogate a station, the interrogate key is depressed followed by entry of the station address from the keyboard. If it is desired to interrogate a set of stations, the set select key is depressed before entering the station address. The control display will indicate an error for incorrect entries, and if so indicated, depressing the clear key will cancel the entry. The interrogate command is then transmitted by depressing the send key. The send key is depressed a second time if it is desired to send the interrogate command while the communication channel is busy. Additional transmissions of the interrogate command can be provided by depressing the send key for each desired transmission.

In order to send an acknowledge command, the acknowledge key is depressed and the station address is entered from the keyboard. The set select key can be depressed before entering the station address to send the acknowledge command to a group of stations. If the acknowledge command has been entered correctly, the send key is depressed to transmit the command. To transmit the acknowledge command when the channel is busy, the send key is depressed a second time. Additional transmissions of the acknowledge command can be provided by depressing the send key for each desired transmission.

The central control station also provides a control mode of operation. Entry and exit from the control mode is achieved by sequentially depressing six numerical keys. The exact sequence of keys depressed can be uniquely specified for a particular supervisory control system to provide security from unauthorized entry of control commands. In order to send a control signal, the control key is depressed and the station address is entered from the keyboard. The set select key is depressed to transmit the control command to a group of stations. Next, the A or B key is depressed to select the desired control group. Then, the numbers of the control signals to be activated are entered from the keyboard. The entire entry can then be reviewed in the control display. If an error has been indicated, the clear key can be depressed and the control command can be reentered. To transmit the command signal, the send key is depressed. The send key can be depressed a second time to transmit the command signal while the transmission channel is busy. Additional transmissions can be provided by depressing the send key for each desired transmission.

The time in hours and minutes is displayed in the control display unless data for a command signal has been entered or the parameter mode has been entered. When the time is displayed, the decimal point between the hours and minutes is flashing. In order to update the time, the time set key is depressed. Next, the year, month, day, hour and minutes are sequentially entered from the keyboard, and finally the time set key is depressed again. The new time setting is entered, displayed and printed out on the external printer.

B. Display Driver Unit and Display Unit

The display driver units and associated display units, under control of the computer, provide a visual indication of the system status, including the status of the central control station in the control display and the status of the other stations in the system in the display units. Each display unit provides status for an individual station, including the station address, the status of 8 input signals, and particular operational status of the station. If a station reports an alarm condition, the displayed status is flashed in the display unit until the flash reset pushbutton is depressed. In the illustrative system, the computer controls up to 16 display driver units which, in turn, drive the control display and up to 61 display units.

The display driver unit contains the logic and memory required to drive the associated light emitting diodes (LEDs) in the corresponding display units so as to achieve the display of the status signals requested by the computer and to transmit the status of the flash reset switches from the display units to the computer in the central control station. The display driver unit has three functional sections: a display control section which accesses the display data from the memory and drives the LEDs accordingly; the memory update section which updates the memory in accordance with the data received from the computer on the data bus; and the flash switch selector which multiplexes the four flash reset switches from the display unit onto the flash switch signal to the computer.

Referring to FIG. 4, the display driver unit 400 is shown with one of the four display units 450. The display unit 450 contains a status display 451 which includes 48 LEDs to be illuminated. A four digit 7 segment display, which contains 28 of the LEDs, is used to display the station address. The decimal point LED in the rightmost digit is illuminated to differentiate fixed display units from rolling display units. The remaining 19 LEDs indicate the power fail condition, the test condition, the station fail condition, and the on/off condition of a group of 8 input signals for that station, a green LED being illuminated for a normal condition (off) and a red LED being illuminated for an alarm condition (on). The flash reset switch 452 is depressed to acknowledge reception of the signal change indicating an alarm condition.

The display control section drives up to 192 display LEDs organized in a 24×8 matrix in accordance with the display data stored in the memory 415. The display LEDs include both point displays and the elements of 7 segment numerical displays. A clock signal source 401 is applied to the address counter 402 to produce a 5 bit binary address. The clock signal source 401 provides a 5,000 hertz train of clock pulses, having a period of 200 microseconds and a pulse width of 20 microseconds. The 5 bit binary address from the address counter 402 is applied to the address decoder 403 and to the address selector 414. The address decoder 403 decodes the 5 bit binary address into 24 signals which are then applied to the display drivers 404 to produce the display driver signals 406.

The display driver unit 400 is assumed not to be in the update condition. Therefore, the address selector 414 routes the 5 bit binary address from the address counter 402 together with the output of inverter 413 to the memory address lines 435. The memory 415 being in the read mode places the data stored at the address selected by the address lines 435 onto the data lines 434. The read-out data on the memory data lines 434 is then placed in the 8 bit latch 420 in accordance with the clock pulse from the clock signal source 401. The output signals from the latch 420 are then applied to the display drivers 421 to provide the display driver signals 408. The display driver signals 406 together with the display driver signals 408 are then applied to the status displays 451 in each of the 4 display units 450 to illuminate the LEDs therein.

The address counter 402 continuously reads the 24 data locations in the memory 415 and sequentially strobes the 24 rows of the display LEDs, while the data from the memory 415 enables selected LEDs in each row by activating the display driver signals 408 for the column of the selected LEDs.

The memory update section of the display driver unit 400 stores new data into the memory 415. The memory 415 is organized into two 24 byte sections so that data can be updated in one section while data is being read out to the displays from the other section. This organization of the memory 415 insures that data is uniformly updated before being read out and applied to the display units 450. The update of the memory 415 is started by receipt of the update start signal 441 from the computer. The update start signal 441 is applied to inverter gate 440, the output of which is applied to toggle flip flop 442 and is provided to enable address counter 424, unit counter 430 and pulse generator 431.

The update clock signal 423 is applied to the AND gate 422 and to the pulse generator 431. In other embodiments of a display driver unit, the clock signal source 401 can also be derived from the update clock signal 423 by appropriate divider means. However, in the preferred embodiment, the clock signal source 401 has been provided independent of the update clock signal 423.

The AND gate 422 provides the update clock signal 423 gated with the output of inverter 444 to enable address counter 424 to count a predetermined number of the update clock signal pulses, the number of pulses being 24 for the preferred embodiment. The address counter 424 provies a 5 bit binary address signal to the flash switch selector 410 and to the address selector 414. The 5 bit binary address signal from the address counter 424 is gated together with the memory select signal 443 by the address selector 414 and applied to the memory address lines 435 to provide the addresses at which data is stored. The three most significant bits of the binary address from the address counter 424 are gated together with the unit enable signal 412 by the flash switch selector 410 to successively gate the 4 flash reset switch signals 405 onto the flash switch signal 411 to the computer.

The address counter 424 provides an output pulse to the unit counter 430 for each frame of 24 update clock signal pulses from AND gate 422. The unit 430 counts a predetermined number of the output pulses from the address counter 424 as determined by the four switches 425 to 428 and then provides a unit enable signal 412. The unit enable signal 412 is activated for the next 24 pulses of the update clock signal 423.

The pulse generator 431, being enabled by the unit enable signal 412, provides a pulse on the update time signal 433 in response to each of the next 24 pulses of the update clock signal 423. The pulses on the update time signal 433 are relatively short compared to the period of the clock signal from the clock signal source 401 and are approximately 5 microseconds in the preferred embodiment. The pulse generator 431 also provides a write enable signal 432 which is of shorter pulse width than the update time signal 433. The update time signal 433 is applied to the address selector 414 to gate the address from the address counter 424 together with the memory select signal 443 to the memory address lines 435. The update time signal 433 is also applied to the buffer gate 416 to enable the data bus lines 407 to be routed to the memory data lines 434 and to the latch 420 to prevent the data in the latch 420 from changing during the update time signal 433. The write enable signal 432 enables the memory 415 to store the data on the memory data lines 434 at the address on the memory address lines 435. The update time signal 433 is also applied to inverter 444, the output of which is applied to AND gate 422 to stretch the output of the AND gate 422 and prevent the update clock signal 423 from being applied to the address counter 424 and change the 5 bit address data during the memory store cycle. This is necessary since the update time signal 433 has a pulse width greater than the pulse width of the update clock signal 423.

When 24 bytes of new data have been stored in the memory 415, the update start signal 441 changes state and causes toggle flip flop 442 to change the state of the memory select signal 443, which causes data to be read from the 24 bytes of the memory which were just updated with new data. The foregoing process is repeated for the next update cycle and new data is stored in the half of the memory determined by the memory select line 443. At the end of each update cycle, the memory select signal 443 changes state so that the new data is read out to the display units.

The four switches 425-428 of the unit counter 430 provide for sixteen different unit enable signals 412 so that each of the possible sixteen display driver units 400 can be consecutively enabled. The use of a data bus 407, update clock signal 423 and an update start signal 441 can be adapted to store data in a plurality of memories using the principles of the foregoing embodiment. Only one clock signal, the update clock signal 423, need be provided since the clock signal from the clock signal source 401 can be derived from the update clock signal 423 by appropriate divider means. Likewise the number of LED indicators that can be driven from the display driver unit 400 can be increased or decreased to accommodate a particular application.

C. Status and Control Station

Figure 5A:
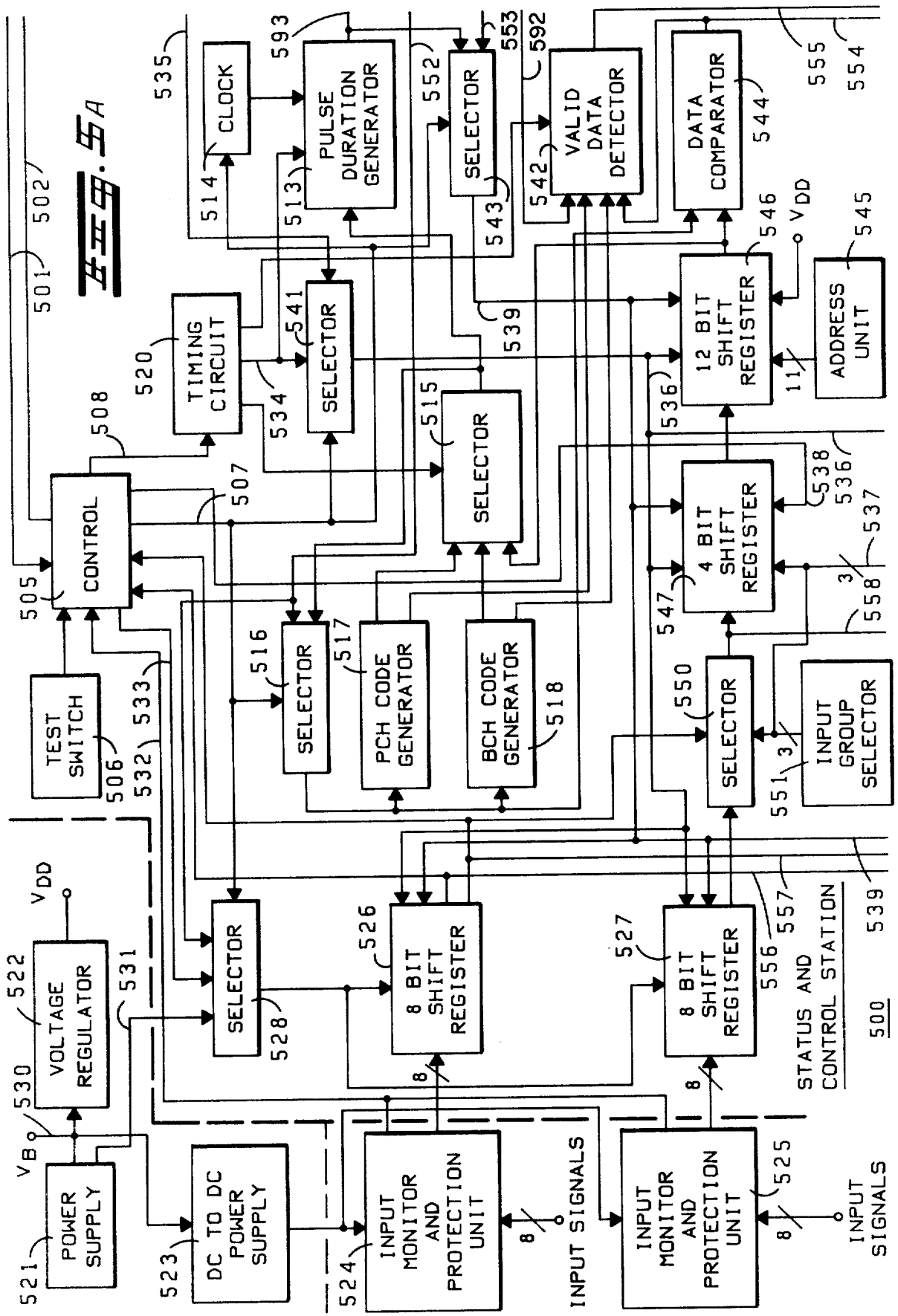
Figure 5B:
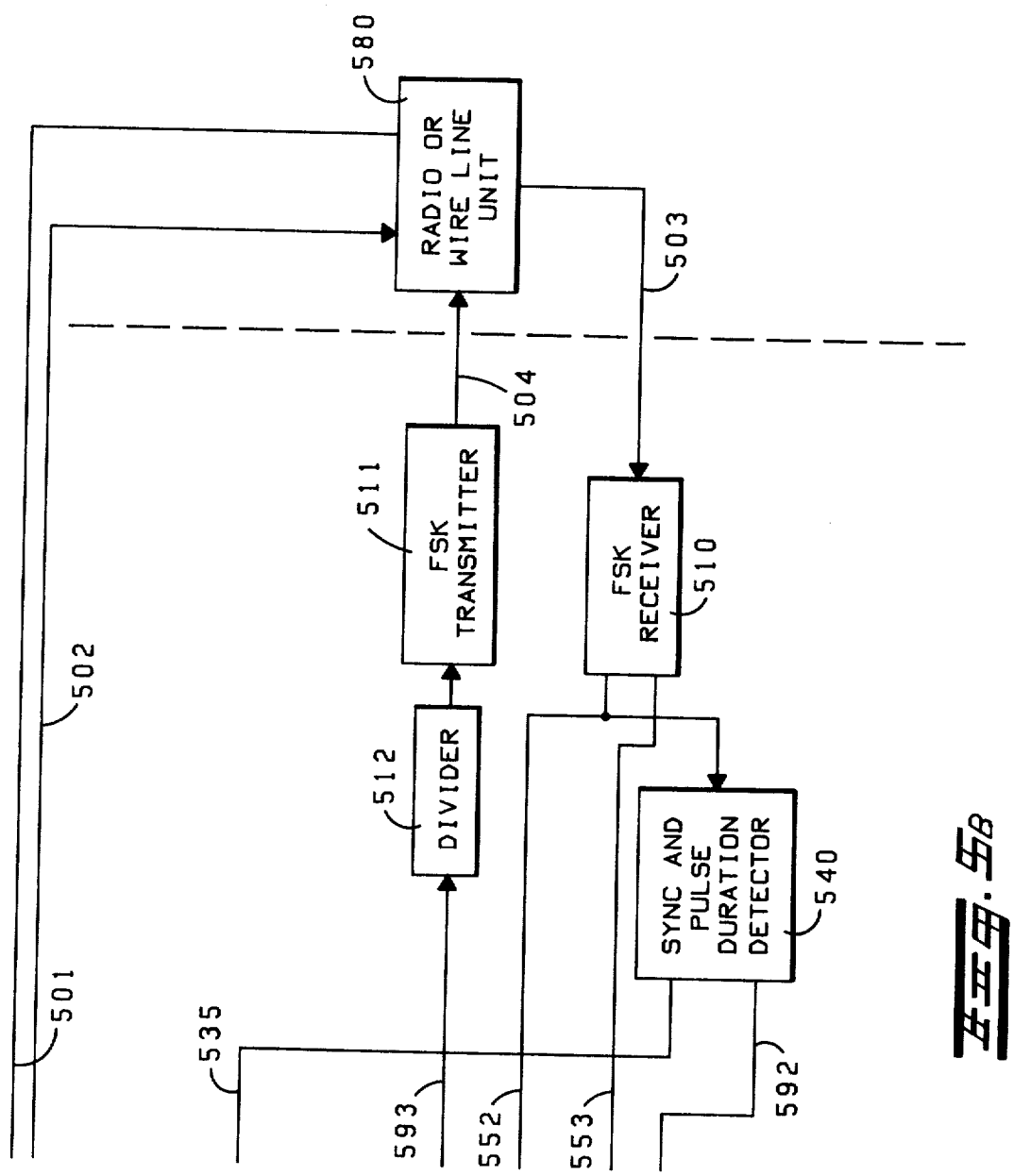

The status and control stations, illustrated in FIGS. 5A, 5B and 5C taken in combination, are used for monitoring the status and controlling the operation of external devices. The monitored status, sensed from input signals, is coded into status signals and sent to the central control station. Command signals are received from the central control station and enable the status and control station to send output signals to the external devices. In the present illustrative system, the status and control station can monitor up to 16 input signals from and send up to 16 output signals to the associated external devices. The status and control station has several different modes of operation which provide additional message signal security, including the check-forward mode and the check-back mode, as will be explained shortly. The status and control station is well suited for applications that require the status and control of unattended remote stations in a supervisory control system.

The status and control station includes a radio or wire line unit, a power supply, an encoder/decoder, an input unit, and an output unit. The input unit monitors a plurality of input signals and provides an output signal to the encoder/decoder unit if one or more input signals has changed state. The encoder/decoder unit loads a status signal, including monitored input signals together with validity codes, into registers, encodes the status signal according to FSK modulation and sends the status signal by means of the radio or wire line unit to the central control station. Coded command signals from the central control station are received by the radio or wire line unit and converted from FSK modulated signals into digital words by the encoder/decoder unit. The command word is loaded into registers in the output unit, and the output unit sends out the output signals in accordance with the command word.

D. Control Station

The control station, illustrated in FIG. 6, is used for controlling the operation of external devices. Command signals are received from the central control station and enable the control station to send output signals to the external devices. In the present illustrative system, the control station sends up to 8 output signals to the associated external devices. The control station is similar to the basic control portion of the status and control station and can be adapted to provide similar modes of operation.

The control station includes a radio or wire line unit, a decoder, an output unit, and a power supply. Generally, coded command signals are received by the radio or wire line unit from the central control station and converted from FSK modulated signals into digital words and loaded into a register by the decoder unit. The output unit sends out the output signals in accordance with the command word in the register. The radio or wire line unit need only have a receiver, since transmitting is not required.

E. Status Station

Figure 7:
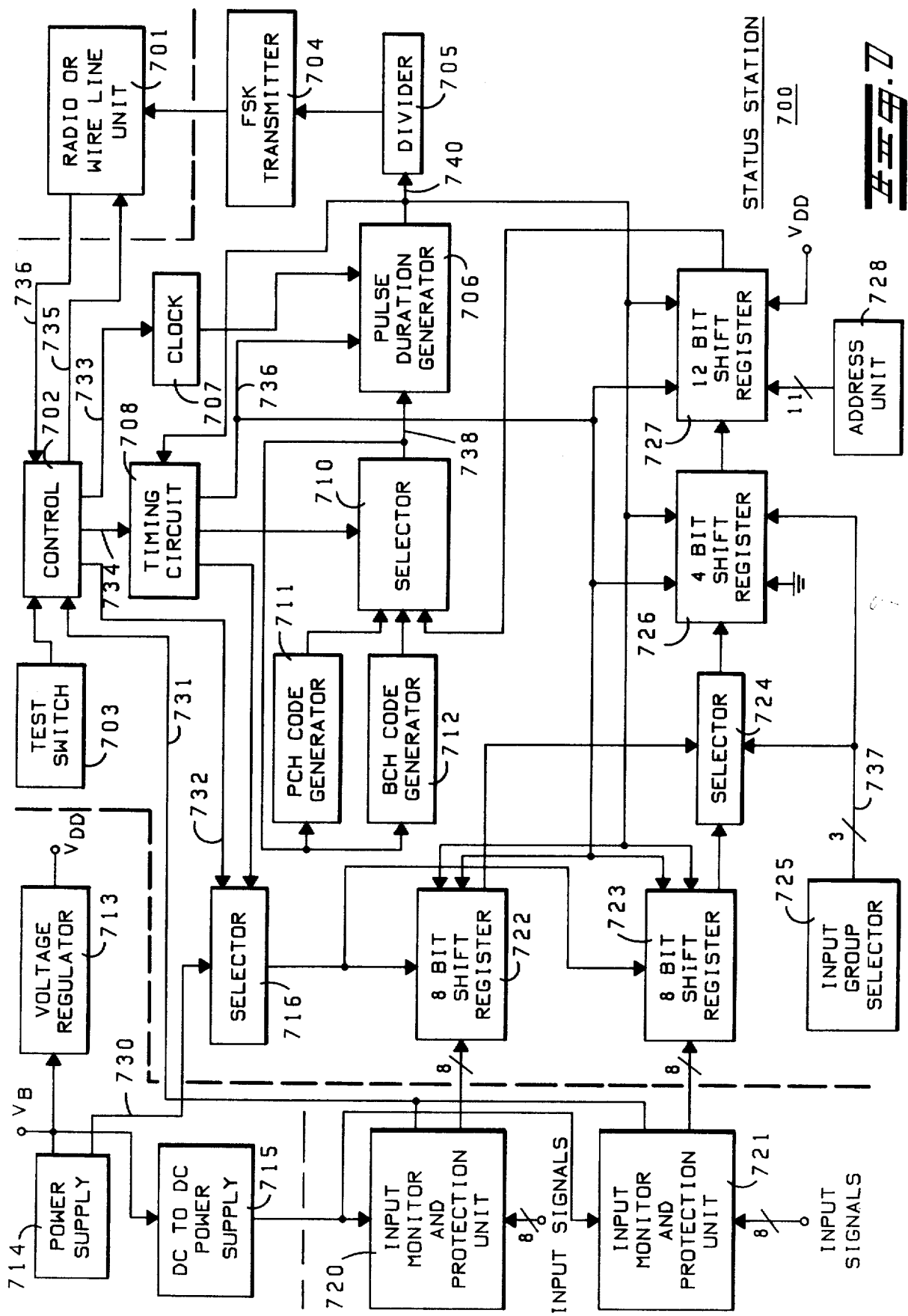
FIG. 7 shows a block diagram of the status station.

The status station, illustrated in FIG. 7, is used to continuously monitor the operation of remote devices and transmit the monitored status, encoded into status signals, to the central control station by means of a radio or wire line unit. The coded status signals are received and automatically displayed by the central control station. Those status signals which have changed state are indicated as alarms in the display. In the present illustrative system, the status station continuously monitors up to 16 input signals from the associated external devices. The status station is similar to the basic status monitoring portion of the status and control station and can be adapted to provide similar modes of operation.

The status station includes a radio or wire line unit, a decoder unit, an input unit and a power supply. Generally, the status of the input signals from the associated external devices are monitored by the input unit, which provides an output signal to the encoder unit if any monitored input signal changes state. The encoder unit loads the input signals into a register, converts the input data word together with a generated validity code into an FSK modulated status signal, and transmits the coded status signal to the central control station by means of the radio or wire line unit. Since the status station only transmits signals, the radio or wire line unit does not require a receiver. However, a receiver in the radio or wire line unit can be used to monitor the communication channel for activity, so that the status station can be operated to transmit status signals only when the communication channel is not busy.

Hereinabove, various features of the invention have been described in detail in conjunction with a supervisory control system. Certain of these features are broader in scope so that they are not limited to a supervisory control system for potential application, and that they can be more broadly applied to other types of systems.

Referring to the busing scheme for storing and reading out data from a memory, according to the prior art, separate buses or leads are provided for data and memory address incorporation. In contrast, as described in detail hereinabove with reference to FIG. 4, in accordance with the present invention the separate leads or buses for the memory address are entirely eliminated, and instead clock and enable signals are used, via clock and enable signal paths or leads, to address the memory. The number of leads or buses eliminated in this manner increase very significantly as the size of the memory increases. This reduction in the number of leads or buses required for data and memory address incorporation has a broader applicability that can be advantageously utilized in any applications.

While hereinabove, an invention for a supervisory control system and various subfeatures which have broader scope of applicability beyond the supervisory control system have been described, various other modifications and changes may be made by those skilled in the art without departing from the spirit and scope of the present invention.

What is claimed is:

1. Control circuitry for storing data signals in, and reading out stored data signals from, a memory, comprising:
means for providing a train of first clock pulses;
means for repetitively providing an update signal and repetitively providing data signals;
means for providing a select signal alternately having first and second predetermined states in response to successive update signals;
first counting means responsive to the update signal for counting successive frames of a predetermined number of first clock pulses and providing first address signals and a first output pulse for each frame;
second counting means responsive to the update signal for counting a predetermined number of first output pulses and provided a second output pulse thereafter;
means for providing a train of second clock pulses;
third counting means for counting successive frames of a predetermined number of second clock pulses and providing second address signals for each frame;
memory means having first and second portions; and
control means for causing said memory means to read out stored data signals from locations addressed by the second address signals in the first and second portions of the memory means in response to the first and second predetermined states of the select signal, respectively, and causing said memory means to store data signals in locations addressed by the first address signals in the first and second portions of the memory means in response to the second output pulse and the second and first predetermined states of the select signal, respectively, whereby the first and second portions of the memory means are alternately updated in response to successive update signals and the first clock pulses.

2. The control circuitry according to claim 1, wherein the control means includes pulse generating means responsive to the second output pulse for providing for each first clock pulse a write pulse having a pulse width less than the interval between successive second clock pulses, the write pulse causing the memory means to store the data signals.

3. The control circuitry according to claim 2, further including register means responsive to the second clock pulses for receiving the read-out data signals, said register means being disabled from receiving read-out output signals during the write pulse.

4. The control circuitry according to claim 3, further including display means and means for applying the read-out data signals to the display means for providing a visual indication of the read-out data signals.

5. The control circuitry according to claim 4, further including means for disabling the first and second counting means in response to the absence of the update signal.

6. Control circuitry for storing data signals in, and reading out stored data signals from, a plurality of memories, comprising:
(a) first control means including:
  (i) means for providing a train of first clock pulses; and
  (ii) means for repetitively providing an update signal and repetitively providing data signals; and
(b) a plurality of second control means including:
  (i) means for providing a select signal alternately having first and second predetermined states in response to successive update signals;
  (ii) first counting means responsive to the update signal for counting successive frames of a predetermined number of first clock pulses and provided first address signals and a first output pulse for each frame;
  (iii) second counting means responsive to the update signal for counting a predetermined number of first output pulses and providing a second output pulse thereafter;

(iv) means for providing a train of second clock pulses;

(v) third counting means for counting successive frames of a predetermined number of second clock pulses and providing second address signals for each frame;

(vi) memory means having first and second portions; and (vii) memory control means for causing said memory means to read out stored data signals from locations addressed by the second address signals in the first and second portions of the memory means in response to the first and second predetermined states of the select signal, respectively, and causing said memory means to store data signals in locations addressed by the first address signals in the first and second portions of the memory means in response to the second output pulse and the second and first predetermined states of the select signal, respectively, whereby the first and second portions of the memory means are alternately updated in response to successive update signals and the first clock pulses from the first control means.

7. The control circuitry according to claim 6, wherein the memory control means further includes pulse generating means responsive to the second output pulse for providing for each first clock pulse a write pulse having a pulse width less than the interval between successive second clock pulses, the write pulse causing the memory means to store the data signals.

8. The control circuitry according to claim 7, wherein each of said second control means further includes register means responsive to the second clock pulses for receiving the read-out data signals, said register means being disabled from receiving read-out output signals during the write pulse.

9. The control circuitry according to claim 8, wherein each of said second control means further includes display means and means for applying the read-out data signals to the display means for providing a visual indication of the read-out data signals.

10. The control circuitry according to claim 9, wherein each of said second control means further includes means for disabling the first and second counting means in response to the absence of the update signal.

* * * * *